US011893396B2

(12) United States Patent
Kuchler et al.

(10) Patent No.: US 11,893,396 B2
(45) Date of Patent: Feb. 6, 2024

(54) DOMESTIC APPLIANCE, DOMESTIC APPLIANCE SYSTEM, AND METHOD FOR OPERATING A DOMESTIC APPLIANCE (71) Applicant: BSH Hausgeräte GmbH, Munich (DE)

(72) Inventors: Markus Kuchler, Gstadt am Chiemsee (DE); Kerstin Rigorth, Mühldorf (DE); Sebastian Sterz, Großaitingen (DE)

(73) Assignee: BSH Hausgeräe GmbH, Munich (DE)

( * ) Notice: Subject to any disclaimer, the term of this patent is extended or adjusted under 35 U.S.C. 154(b) by 426 days.

(21) Appl. No.: 17/265,529

(22) PCT Filed: Sep. 24, 2019

(86) PCT No.: PCT/EP2019/075666
§ 371 (c)(1),
(2) Date: Feb. 3, 2021

(87) PCT Pub. No.: WO2020/064709
PCT Pub. Date: Apr. 2, 2020

(65) Prior Publication Data
US 2021/0255878 A1 Aug. 19, 2021

(30) Foreign Application Priority Data
Sep. 25, 2018 (DE) .................... 10 2018 216 367.7

(51) Int. Cl.
*G06F 9/00* (2006.01)
*G06F 9/445* (2018.01)
(Continued)

(52) U.S. Cl.
CPC .......... *G06F 9/44505* (2013.01); *G06F 16/22* (2019.01); *G06F 16/245* (2019.01); *H04L 67/12* (2013.01); *G06F 9/4401* (2013.01)

(58) Field of Classification Search
CPC .... G06F 9/44505; G06F 16/22; G06F 16/245; H04L 67/12; H05B 6/668; F24C 7/082
(Continued)

(56) References Cited

U.S. PATENT DOCUMENTS 11,670,141 B1 * 6/2023 Zalewski ............. G06Q 20/327
 705/26.8
11,672,050 B2 * 6/2023 Cheng .................... H05B 6/645
 219/411
(Continued)

FOREIGN PATENT DOCUMENTS

| DE | 102009000652 A1 | 8/2010 |
| DE | 102012217004 A1 | 3/2014 |
| DE | 102016111244 B3 | 10/2017 |

OTHER PUBLICATIONS

National Search Report DE 102018216367.7 dated Aug. 21, 2019.
International Search Report PCT/EP2019/075666 dated Dec. 11, 2019.

*Primary Examiner* — Volvick Derose
(74) *Attorney, Agent, or Firm* — Michael E. Tschupp; Andre Pallapies; Brandon G. Braun (57) ABSTRACT

A network-compatible household appliance includes a communications facility for coupling via a data link to an external database. The household appliance is configured to receive operating parameters relevant for an operating sequence from the database via the communications facility, to store the operating parameters for implementing the operating sequence by the household appliance, and, when triggered by a user, to automatically transfer the operating parameters for the operating sequence to the database via the communications facility.

13 Claims, 2 Drawing Sheets

(51) Int. Cl.
*G06F 16/22* (2019.01)
*G06F 16/245* (2019.01)
*H04L 67/12* (2022.01)
*G06F 9/4401* (2018.01)

(58) Field of Classification Search
USPC .......................................................... 713/2
See application file for complete search history.

(56) References Cited

U.S. PATENT DOCUMENTS

| | | | | |
|---|---|---|---|---|
| 2015/0147441 | A1* | 5/2015 | Lagerlof | F24C 7/08 |
| | | | | 99/332 |
| 2015/0289324 | A1* | 10/2015 | Rober | H05B 6/668 |
| | | | | 219/707 |
| 2017/0224148 | A1* | 8/2017 | Koennings | G05B 15/00 |
| 2017/0224149 | A1* | 8/2017 | Koennings | G05B 19/41815 |
| 2018/0213965 | A1* | 8/2018 | Li | A47J 27/00 |
| 2019/0128743 | A1* | 5/2019 | Dingman | G01K 3/005 |
| 2019/0320844 | A1* | 10/2019 | Keller | H05B 6/6482 |
| 2020/0000276 | A1* | 1/2020 | Kemker | G06F 16/252 |
| 2020/0096202 | A1* | 3/2020 | Guida | F24C 15/327 |

* cited by examiner

DOMESTIC APPLIANCE, DOMESTIC APPLIANCE SYSTEM, AND METHOD FOR OPERATING A DOMESTIC APPLIANCE

CROSS-REFERENCES TO RELATED APPLICATIONS

This application is the U.S. National Stage of International Application No. PCT/EP2019/075666, filed Sep. 24, 2019, which designated the United States and has been published as International Publication No. WO 2020/064709 A1 and which claims the priority of German Patent Application, Serial No. 10 2018 216 367.7, filed Sep. 25, 2018, pursuant to 35 U.S.C. 119(a)-(d).

BACKGROUND OF THE INVENTION

The invention relates to a network-compatible household appliance having a communications facility for coupling via a data link to an external database, wherein the household appliance is configured for the purpose of receiving relevant operating parameters for an operating sequence from the database via the communications facility and for the purpose of storing said relevant operating parameters for implementing an operating sequence. The invention also relates to a household appliance system that has at least one network-compatible household appliance and one database that can be coupled via a network to the household appliance, said database being configured for the purpose of storing operating parameters for an operating sequence of the household appliance and for the purpose of providing in a retrievable manner said operating parameters to the at least one network-compatible household appliance. Moreover, the invention relates to a method for operating a household appliance system in which an operating sequence is implemented on a network-compatible household appliance. The invention can in particular advantageously be used on cooking appliances as household appliances.

Recipe portals are found on the internet in which users can suggest, comment on and rate recipes. The specifications for cooking parameters, which are required in order to cook a specific recipe (for example cooking temperatures, cooking time, grilling levels, rack heights, operating modes such as a circulating-air mode, upper/lower heat, grill operating mode etc.), are typically not dependent upon the appliance and frequently therefore do not precisely suit a specific cooking appliance. Moreover, specifications with regard to cooking parameters are frequently not listed completely, for example "30 minutes at 180° C." without indicating the operating mode. An exact reproduction of the cooking procedure is consequently not possible in many cases.

Moreover, manufacturer-operated recipe databases having recipes that are provided in advance by the manufacturer of the cooking appliance exist and said recipe databases are stored in the appliances. These recipes comprise cooking parameters that are coordinated to the specific cooking appliance. However, these recipes are disadvantageously particularly restricted in their variety. It is not possible for users to create recipes or program sequences having cooking parameters that the users have selected themselves. The recipes are usually created and tested in manufacturer-based test kitchens.

The company Vorwerk offers an online recipe database for the appliance "Thermomix" in which cooking parameters can be transferred together with additional recipe specifications (ingredients, quantity specifications) directly to the appliance "Thermomix". It is not possible for the users to create their own recipes or to amend existing recipes.

US 2015/0289324 A1 describes the possibility of storing cooking procedures having associated sensor data relating to multiple appliances in a common database. During later cooking procedures, prevailing sensor data of a cooking appliance is compared with the database and the suitable parameters for the cooking procedure are thereby determined.

BRIEF SUMMARY OF THE INVENTION

The object of the present invention is to at least in part overcome the disadvantages of the prior art and in particular to provide a particularly user-friendly possibility for storing, and in particular later sharing with multiple users, operating sequences of household appliances, in particular cooking appliances, for later repeat use.

This object is achieved in accordance with the features of the independent claims. Advantageous embodiments are the subject matter of the dependent claims, the description and the drawings.

The object is achieved by a network-compatible household appliance having a communications facility for coupling via a data link to an external database, wherein the household appliance is configured for the purpose of
- receiving relevant operating parameters for an operating sequence from the database via the communications facility and for the purpose of storing said relevant operating parameters for implementing an operating sequence and
- in a manner triggered by the user automatically transferring to the database via the communications facility the relevant operating parameters for an operating sequence that is implemented by the household appliance.

This household appliance has the advantage that with particularly little effort a user can upload an operating sequence, which is implemented by said user, via a data network into a database. The operating sequence that is stored in the database can be retrieved again by this user or by another user and can then be implemented again on the household appliance of the other user in particular without a further user adaptation. It is particularly advantageous in this case that it is not necessary in the simplest case for a user to provide any further inputs for example with regard to operating parameters.

The household appliance can be a cooking appliance (for example an oven, a hob, a steam-generating facility, a microwave-generating facility etc. or an arbitrary combination thereof). The household appliance can also be a laundry handling appliance (for example a washing machine, a tumble dryer or a combination thereof), a dishwashing appliance, another food treatment appliance such as a coffee machine, a rice cooker, an appliance for producing dough etc. In general, the household appliance can be an electrically operated appliance—in particular in the sense of "white goods"—in particular a kitchen appliance. The household appliance can be a household large appliance or a household small appliance.

The fact that the household appliance is a network-compatible household appliance can in particular include the fact that it is configured for the purpose of communicating via its communications facility with external units such as other network-compatible household appliances, with user end devices such as smartphones, tablet PCs etc., with network-based units such as a server, the so-called "cloud" etc. via a data link.

The communications facility can comprise a communications facility or multiple communications facilities, for example at least one wireless communications facility (for example a Bluetooth module, a wireless local area network module etc.) and/or at least one wired communications facility (for example an Ethernet module etc.).

The external database is a database that is situated or provided outside of the household appliance. The database can be by way of example a network-based database that is located for example on a network server or in the so-called "cloud". The database is interactive in the sense that it is accessible to users, in particular registered users. The database can be operated for example by a manufacturer of the at least one household appliance or by a database proprietor (also referred to below together simply as manufacturer). A user is advantageously registered by the manufacturer. A closed user association or "community" can be formed by the registration procedure. The user association can be limited to users that use the household appliances of a specific manufacturer, however, it is not limited to this in general.

One development is that access to a specific operating sequence is limited to a subgroup or subset of users ("private access" or "private group"). In one development, this subgroup can comprise only the user who has uploaded the operating sequence to the database. In particular, a user who has transferred a specific operating sequence to the database can provide or deny other users membership to a private group. One further development is that access to an operating sequence is possible for all (in particular registered) users ("public access"). In one variant, a registered user can select a freely selectable username.

One development is that the registration comprises a procedure of linking to one or multiple household appliances. For example, a user who is registered in a registration database is therefore logically linked to one or multiple specific household appliances. This provides the advantage that it is known which specific household appliances are available to a user. One or multiple different users (for example family members) can be allocated to a specific household appliance. In addition, a unique manufacturer ID or type ID can be allocated to a household appliance.

One development is that an (in particular registered) user can access the database via a specific application program ("app"). The user can be registered in order to use the app. The app can run on a user end device such as a tablet PC, smartphone, laptop, desktop etc. Alternatively or in addition, a user can access the database directly via a household appliance.

The term "relevant" operating parameters for an operating sequence is understood as at least all the operating parameters that it is necessary to know in order to implement the operating sequence. In one development, the relevant operating parameters comprise all the operating parameters that can be directly adjusted by the user or in addition all the operating parameters of the household appliance and in fact also any operating parameters that cannot be adjusted directly by a user (operating parameters inside the appliance itself).

The fact that the relevant operating parameters for an operating sequence that is implemented by the household appliance are transferred to the database (and are therefore in particular also stored and can be retrieved) includes in particular the fact that only operating parameters for which an operating sequence has been completely implemented are transferred to the database.

The fact that operating parameters can be transferred to the database in a "manner triggered by the user" includes in particular the fact that a user must perform at least one action in order to transfer the operating parameters to the database. The user must therefore actuate for example a corresponding actuating field. The user's action can be triggered on the household appliance and/or on a unit such as a smartphone etc. that is linked to the household appliance. One embodiment is consequently that the household appliance has an actuating field for triggering the automatic transfer of the relevant operating parameters to the database.

The fact that operating parameters can be transferred "automatically" to the database includes in particular the fact that the operating parameters are compiled automatically by the household appliance. A user consequently does not need to provide the operating parameters again. A particularly simple and user-friendly compilation of the operating parameters for the transferring procedure is therefore achieved.

By virtue of the fact that relevant operating parameters for an operating sequence can be received from the database via the communications facility and said operating parameters can be stored so as to implement an operating sequence, the advantage is provided that a user can select a specific operating sequence that is stored in the database and can download said operating sequence to their household appliance. It is therefore rendered possible to share the operating sequences that are stored in the database with various users. The advantage is therefore also achieved that the user does not need to make any manual adjustments in order to implement an operating sequence (however this is possible when required).

One embodiment is that the household appliance is configured for the purpose of querying at least one associated user specification with regard to the operating sequence that is implemented on said household appliance and for the purpose of transferring the at least one submitted user specification together with the relevant operating parameters to the database. As a consequence, the advantage is achieved that further information can be stored in the database in addition to the relevant operating parameters and said further information can further improve a reproduction of an operating result in a particularly user-friendly manner. Such user specifications can include for example the type and quantity of at least one commodity or material that is to be handled, a pre-handling procedure of the at least one commodity or material that is to be handled, ratings of the handling result, comments, images etc.

The combination of the relevant operating parameters, user specifications and further information with regard to the operating sequence or to a result thereof can also be referred to below as a "program package". A program package can comprise alternatively or in addition one or multiple predetermined (in other words not specified by a user) specifications or items of information. In its simplest form, the program package can also comprise only the relevant operating parameters of an operating sequence. Where expedient, relevant parameters and program packages that include these relevant parameters can also be used below in a similar manner to the description of the invention.

If a program package is downloaded from the database to the household appliance, the additional specifications or information can be displayed on a display facility of the household appliance, for example on a screen of the household appliance. In particular, the additional specifications or information can be displayed within an operating program or sequence controlling procedure, for example as user instructions. The additional specifications or information can alternatively or in addition be displayed on a user end device that can be coupled via a data link to the household appliance and/or to the database. In general, the relationship of program packages in connection with associated operating parameters can be provided directly on a user interface of the household appliance, which has online access to the database.

One development is that the program package comprises at least one "interactive element". The term "an interactive element" can be understood as a sequence element that is integrated or is to be integrated into an operating sequence so as to guide the operating sequence (can also be referred to as "user guidance") and said sequence element waits for at least one predetermined event to occur. The at least one predetermined event can include for example a user action and/or achieving predetermined values of sensors inside the appliance itself ("trigger"). This development provides the advantage that an operating sequence that is associated with a program package can be embodied in a considerably more user-friendly manner than an operating sequence without interactive elements. (The interactive elements turn an "unintelligent" operating sequence into a particularly user-friendly "interactive" operating sequence). The presence and/or the quality of interactive support can be an evaluating criterion of the program package.

In one development, the operating sequence is only then continued if the at least one predetermined event has occurred, for example a specific user action has been performed. The interactive element can for this purpose for example comprise an instruction to a user during the operating sequence to perform a specific user action. The interactive element can be provided for example as a program block or as a program step or program steps. An interactive element can in other words therefore include an interaction with the user that is performed during a program sequence. For the case of a household appliance in the form of a cooking appliance, the user can be prompted to position the joint on a grill for example when preparing a joint after the expiration of a time that is predetermined in a cooking program. After the user has confirmed this action, an operating step of "grilling with circulating air" is started in order to provide the joint with a particularly crispy crust. In one variant, the user must activate the circulating-air function, in another variant this is performed automatically by the cooking appliance. This instruction or this prompt can be linked in addition or alternatively to a measurement value of a core temperature sensor.

One particularly user-friendly development is that at least one instruction to a user that is linked to an interactive element or is associated with an interactive element includes an audio instruction and/or a visual instruction (for example an image, an image sequence or a video). In principle, the instruction can be decorated in an arbitrary manner. In particular, a particularly detailed and precise user guide can be provided by a video introduction (in the case of cooking appliances for example as so-called "guided cooking").

One development is that a program package (in particular including at least one interactive element) can be changed via an application program—by way of example the application program already described above—in particular on the part of the user or by the user. The app can therefore be used for the purpose of programming an operating sequence or the associated program package. The app can comprise a programming interface for this purpose by way of example. The programming interface can be embodied for visual programming. It is possible by means of the app to represent for example different sections of an operating sequence and to make changes to said operating sequence and it is possible to add new sequence steps or operating steps.

One development is that a program package can be newly created by a user via a suitable app and where applicable can be expanded using interactive elements by way of example in a simple visual programming procedure. In this case, it is not necessary for an operating sequence to have been previously implemented.

One embodiment is that the at least one user specification comprises a rating of at least one characteristic of a commodity that is being handled by the operating sequence or program package. As a consequence, advantageously the operating sequence can be rated in relation to the quality of its result as a characteristic. The user specification can include a rating on a satisfaction scale (for example three of five possible stars or similar). The operating sequence can also be rated advantageously in relation to other aspects as a characteristic of the commodity that is being handled, for example in relation to its speed, ease of implementation etc.

One embodiment is that the at least one user specification comprises a rating of multiple characteristics of a commodity that is being handled by the operating sequence and/or of individual aspects of the operating sequence. A rating of the operating sequence or its result is therefore provided which is particularly precise and understandable for other users. By way of example, in order to rate a cooking sequence a user can rate the quality of the finished food with reference to multiple characteristics or criteria for example "crispy", "juicy", "spicy", "tender" and/or with reference to a characteristic of an operating sequence such as "quick" etc., for example with reference to a respective rating on a satisfaction scale or in the form of so-called "tags".

One embodiment is that the operating parameters or program packages that are downloaded from the database to a household appliance can be changed by the user. This therefore provides the advantage that a user can adapt an operating sequence to their tastes or desired result. The user can then automatically transfer to the database the variant of the operating sequence that is amended in this manner as a program package having the relevant operating parameters and with or without further information. It is then possible to store various variants of relative operating parameters/of an operating sequence/of a program package in the database.

One development is that each program package (comprising at least the relevant operating parameters) is allocated a unique identifier or ID. If a program package that is downloaded is amended, this amended program package is advantageously allocated a new identifier that can clearly lead back to the identifier of the original downloaded and subsequently amended program package. As a consequence, the advantage is achieved that a specific program package can be clearly identified as a variant of a previously stored program package. In turn, the advantage is achieved that program packages that are stored in the database can be identified as variants of a first program package, for example within a "program package function tree". This can be used by way of example for the purpose of displaying to a user in a particularly clear form the variants of a program package that are available in the database. It is possible to continue to use the identifier for different variants for example in a manner similar to a "block chain".

One development is that the relevant operating parameters of an operating sequence that are transferred to the database (or the corresponding program package) have been provided by the user, in other words have not been provided by modifying previously downloaded operating parameters or a program package. It can consequently advantageously also be provided that users can add program packages that they have created themselves to the database. The operating parameters are programmed by the user for example manually on the household appliance or via an application program—for example that is executed on a user end device—and where applicable are linked together with describing text and images, interactive elements etc. to a program package. By way of example, a user can permit an operating sequence to run on the household appliance, a user can supplement the associated operating parameters on the household appliance or after transferring them to a user end device within a program package a user can optionally supplement said operating parameters with further elements such as user specifications, interactive elements etc. and then can upload or transfer said operating parameters into the database. Other users can download, rate or also amend this program package and can upload said program package as a new program package, for example in that after an operating sequence said users transfer the operating parameters that the users have changed directly from the household appliance to the database.

As a possible example for a cooking appliance, a user A provides a program package (can also be referred to as a "recipe block" for cooking appliances) for lasagna with the associated cooking parameters, for example upper/under heating at 180° C. for 40 minutes and uploads this recipe block into the database. A user B would likewise like to prepare lasagna and downloads the recipe block from user A to their cooking appliance. However, at the end, user B adds a further five minutes grilling time and therefore creates a new recipe block that they likewise add to the database. The two recipe blocks can be rated independently of one another by further users. Some time later, a user C would like to prepare lasagna, owing to user comments and a better rating, user C chooses the recipe block of user A.

In general, a function tree can be provided by in particular the user providing a variation of program packages (for example a recipe block function tree in the case of cooking appliances with recipe blocks as program packages) in which users can identify which amendments have been made.

One embodiment is that the household appliance is a cooking appliance. The cooking appliance can comprise a cooking compartment for handling food and then for example can be a microwave appliance, oven, stove etc. The operating parameters can comprise for the case of a cooking appliance in particular cooking parameters such as a time profile of a cooking compartment temperature, operating modes, a rack height, an addition of steam (point in time and/or duration), a microwave power level or other microwave parameters etc. The operating sequence can then also be referred to as a cooking sequence, the program package can also be referred to as a recipe or recipe block. User specifications or other information can comprise for example information with regard to rating the quality of a finished food with reference to one or multiple characteristics or criteria, for example "crispy", "juicy", "spicy", "tender" and/or with reference to a characteristic of a cooking sequence such as "quick" etc., for example with reference to a respective rating on a satisfaction scale or in the form of tags. The quality of the finished food can be rated in general for example with reference to taste, cooking degree (for example soft, "al dente", crispy etc.), sensation in the mouth, visual appearance (for example a degree of browning), etc.

The object is also achieved by a household appliance system, at least having
  at least one network-compatible household appliance as described above and
  one database that can be coupled via a network to the at least one household appliance, said database being configured for the purpose of storing relevant operating parameters for an operating sequence of the household appliance and for the purpose of providing in a retrievable manner said operating parameters to the at least one network-compatible household appliance.

The household appliance system can be embodied in a similar manner to the household appliance as described above and has the same advantages. The relevant operating parameters can therefore be transferred into the database as a program package, where applicable with additional specifications and information and can be stored in said database. The database is also embodied in particular as an interactive database. The interactive database can be used in particular as a database of an operating sequence portal (for example a recipe portal), which users can access in a private and/or in a public mode in order to view, to rate and to download to their household appliances etc. the respective accessible program packages.

The household appliance system can have at least one data processing facility (for example a microprocessor) in order to process, prepare etc. data that is stored in the database or elsewhere. The data processing facility can be allocated to a computer such as a server or similar or can be made available distributed across a ("cloud-based") data network.

The possibility of providing in a retrievable manner the relevant operating parameters or an associated program package to the at least one network-compatible household appliance in one development can comprise the fact that the relevant operating parameters or an associated program package can be transferred or downloaded to the household appliance directly from the database (in other words without caching on a user end device). The development also includes the fact that the relevant operating parameters or an associated program package can be initially transferred or downloaded from the database onto a user end device and can be viewed and where applicable amended on said user end device by a user before said operating parameters can be transferred or downloaded—where applicable in a manner triggered by the user—further to the household appliance.

One embodiment is that
  it is possible for a user to submit a rating for a set of operating parameters that is stored in the database and that is associated with a specific operating sequence or for a program package that is stored in the database,
  the household appliance system is configured for the purpose of calculating an average rating from multiple individual ratings and
  the average rating can be stored in and retrieved from the database such that it is linked to the operating sequence.

The advantage is therefore achieved that a user can see at least one average rating that is linked to a set of operating parameters or a program package. The at least one average rating can comprise an overall rating of the program package and/or average ratings that are associated with multiple different characteristics or criteria.

One embodiment is that multiple variants of an operating sequence or program package are stored together with their ratings in the database and the household appliance system is configured for the purpose of only storing the variant(s) with the highest average rating after at least one predetermined event has occurred. The advantage is therefore achieved that only the variant(s) that has/have obtained the best user reception (for example expressed by highest user rating) are managed in the database. This in turn increases user satisfaction with the operating sequence or program package and improves clarity when a user is searching through the database. Variants with low user ratings can be deleted from the database automatically or by the manufacturer. In particular, the automatic retention of only the variant(s) that has/have obtained the highest user ratings or the deletion of variants with low (comparatively poor) user ratings renders it possible in particular for the advancement or optimization of the program packages or operating sequences that are stored in the database to be purely controlled by user ratings and therefore to be independent of a manufacturer or database proprietor. The occurrence of at least one predetermined event can for example include reaching a specific percentage and/or absolute number of ratings that are submitted for a specific variant, a period of time of storage in the database, etc. As a consequence, the advantage is achieved that by using large quantities of data, poor ratings owing to errors in application (outliers) do not carry weight.

By way of example, an original recipe block can be stored in the database and said recipe block represents a recipe for potatoes au gratin in which a cooking time of 60 minutes at 180° C. in the circulating-air mode is used. This original recipe block (base variant) is reproduced by 100 users and in this case is rated with 3.8 of maximum 5 stars. A user changes the cooking parameters to 55 minutes at 185° C. and uploads an accordingly amended recipe block as a variant into the database. The amended recipe block is likewise reproduced by 100 users. In this case, an average rating of four stars is provided. Since the amended recipe block has a higher rating than the original recipe block, the original recipe block is deleted, and the amended recipe block is adapted as the new base variant. This can be repeated an arbitrary number of times.

One development is that not just the currently highest rated program package is stored in the database but rather n (n>1) highest rated variants are also stored. As a consequence, a user can be offered a greater selection of variants.

One development is that in addition to storing a currently highest rated program package, "individual" program packages are stored in the database that have been marked by specific users as being program packages to be stored for said users (individually). An individual program package can be seen and/or downloaded in one development only by users who have marked this individual program package. A user can then decide whether they would like to use the individually marked version or the newest version.

One development is that the database is filled at the start with a group of first program packages ("base", "original" or "parent" program packages) that have been provided for example by a manufacturer. During the course of time, new first program packages can be added, for example by a manufacturer or by a user.

One embodiment is that in addition variants of a current (for example highest rated) program package that is stored in the database are generated and stored in the database, said variants being generated by means of an algorithm. These variants can then likewise be downloaded by users, can be performed by means of the household appliances of said users (for example reproduced) and then rated. The advantage is therefore achieved that a particularly high number of variants can be tested and rated. Alternatively, variants can also be provided by a manufacturer and or third-party provider, by way of example after tests. The variants can be provided by the household appliance system or another instance.

The operating parameters that can be varied by the algorithm can comprise in particular all the operating parameters that can be directly adjusted by a user on the household appliance. For the case of a cooking appliance, the operating parameters can comprise by way of example cooking parameters such as an operating mode (upper/lower heat, hot air, grill, microwave combination), power levels (microwave, heating body), cooking temperatures and cooking duration. The operating parameters that can be varied by the algorithm can also comprise in particular operating parameters that cannot be directly adjusted by a user on the household appliance. For the case of a cooking appliance, such operating parameters for example include antenna rotation during a microwave operation, advanced parameters for the microwave operation, which are available when using semiconductor-based microwave generation, a speed of a fan motor etc. The variation of the operating parameters can also be extended to further parameters such as a selection of a rack height, a preparation, ingredients and ingredient quantities etc. The operating parameters are advantageously amended in an iterative manner in small steps.

In general, a permitted value range can be set for each operating parameter, wherein the responsibility for setting the value range can lie for example with the manufacturer or database proprietor. As a consequence, inefficient settings or settings that damage the appliance such as temperatures that are too high or similar are avoided.

One embodiment is that multiple variants of an operating sequence or the associated relevant operating parameters or program package are stored together with their ratings in the database and the household appliance system is configured for the purpose of storing at least two variants as different operating sequences. In other words, different variants of operating sequences or program packages can be stored as "new" or stand-alone operating sequences or program packages. This grading as a stand-alone operating sequence can be provided automatically by the household appliance system and/or by the manufacturer. One development is that the household appliance system is configured for the purpose of storing at least two variants as different operating sequences in the event of at least one criterion for this being met. One possible criterion comprises the fact that the variants of the operating sequence have a group of individual ratings or rating categories (in other words do not only comprise single rating or rating categories) and the at least two variants in at least one rating category have noticeably differentiable average ratings. This can indicate that the at least two variants display or operate different user wishes. If by way of example two operating sequences are cooking sequences for preparing chicken and the cooking sequences noticeably differ from one another in the ratings category "crispy", the cooking sequences can be saved in the database as stand-alone cooking sequences "juicy chicken" and "crispy chicken". The original cooking sequence "chicken" is therefore divided. The decision to store different operating sequences can be made based upon fuzzy logic, independent learning or by the use of artificial intelligence.

One embodiment is that the household appliance system is configured for the purpose of storing an operating sequence as a stand-alone operating sequence based upon a previous operating sequence or program package and a group of individual ratings of the preceding operating sequence represents a differentiable subset of ratings for said stand-alone operating sequence. A stand-alone operating sequence can therefore be derived or branched off in particular from an existing operating sequence or program package if a noticeably differentiable subset of ratings is provided for at least one group of individual ratings of the preceding or existing operating sequence. If the operating sequence is by way of example a cooking sequence for preparing a chicken and there are two noticeably different groups of individual ratings in the ratings category "crispy" (for example with high and low ratings), the cooking sequences can be stored in the database as stand-alone cooking sequences "juicy chicken" and "crispy chicken". The original cooking sequence "chicken" is therefore also divided in this case. In this case, the operating parameters of at least one of the operating sequences can be changed in order to increase a future rating. The operating parameters for the cooking sequence "juicy chicken" can therefore be maintained while a higher cooking temperature and/or a longer cooking time is set for the cooking sequence "crispy chicken".

One development is that operating sequences or program packages having different operating parameters are stored in the database for different household appliances. These operating sequences or program packages are advantageously coordinated to the respective household appliance, for example in relation to its functionality. In one development, only the operating sequences or program packages that are stored in the database and that are suitable or provided for a household appliance that is linked to the user are visible for a user. By way of example, it is possible for cooking appliances to offer specific recipe blocks for each appliance group (for example full-size/compact appliances, microwaves or steaming appliances) and said recipe blocks differ in the respective program sequences and cooking parameters. In particular, the more functionalities or operating modes (steam, microwave etc.) that are available in the cooking appliance, the more recipe blocks are made available to a user.

One embodiment is that the household appliance system is configured for the purpose of storing operating parameters for an operating sequence of the household appliance (in particular within a program package) and for providing in a retrievable manner the operating parameters in an adapted form for at least one network compatible household appliance having a different functionality. The household appliance system can therefore render it possible to adapt operating parameters or a program package to household appliances, for which the original operating parameters or program packages are not suitable or cannot be used. This provides the advantage that operating sequences or program packages can be used for a particularly high number of household appliances. In particular, the advantage is also achieved that operating parameters or program packages that have been transferred by a specific user to the database and consequently are only coordinated to the household appliance of said specific user can be used by users with household appliances having other functionalities or characteristics.

The adaptation of the operating parameters can be performed automatically by the household appliance system, by way of example by comparison with an adaptation database. Data ("adaptation data") can be stored in the adaptation database and said data renders the adaptation possible. The adaptation data may have been provided for example by a manufacturer of the household appliances and can include for example tables, characteristic curves etc.

One embodiment is that the household appliance having a different functionality has a reduced functionality in comparison to the household appliance for which the operating sequence is stored and the household appliance system is configured for the purpose of adapting at least one operating parameter of the household appliance having reduced functionality so that when the operating sequence is executed on the household appliance having reduced functionality, a handling result is approximated with respect to the handling result of the household appliance for which the operating sequence is stored. This is in particular advantageous if an operating sequence or program package is only provided for a household appliance having a high number of functionalities but is to be usable for users that have simpler household appliances. If for the case of a cooking appliance by way of example a recipe block is conceived for an oven/microwave combination operation, the cooking time can therefore be increased in a conventional oven without the microwave function in order to compensate for the lack of microwave power. The cooking parameters that are specific for the household appliance are therefore always downloaded from the database.

It is possible to display to a user for example by way of a display message that the operating parameters of the operating sequence are adapted or have been adapted to their device configuration.

In general, it is also possible to create various user profiles. In one user profile, a user can nominate specific preferences, for example for cooking sequences a user can input desired cooking settings for meat, pasta or vegetables or further preparation habits. As a consequence, the advantage is achieved that preferred program packages, for example recipe blocks, can be displayed to a user and said recipe blocks correspond to the preferences of said user. Alternatively or in addition thereto, program packages can be modified or varied for the user so that said program packages better correspond to the preferences of said user. It is therefore possible for the cooking parameters that are allocated to a recipe block to be amended by a household appliance system automatically with the aim of increasing cooking temperatures or cooking durations if it is apparent from a user profile that the user prefers particularly crispy cooking results.

It is also possible to subdivide users of cooking appliances into groups according to their cooking habits or cooking tastes. In one development, only the ratings of a specific group are then taken into account for the optimization of a program package, in particular recipe block. In particular, users can also allocate themselves to a group and this can also be redefined for each cooking procedure individually and spontaneously. It is consequently advantageously possible for a diverse range of variants to be provided for different user groups from one basic recipe block. Information with regard to preferences and habits of a user can also be queried, for example can be determined on a household appliance or a user end device or automatically by the household appliance system from the use of the household appliances. Information can be amended in one variant by a user.

As one possible example, a manufacturer of cooking appliances uploads a basic recipe block for pork joint into the database at the start. A cooking duration of 60 minutes in a circulating-air mode at a cooking compartment temperature of 180° are provided in said basic recipe block as cooking parameters. This recipe block is followed by various users with different preferences. The basic recipe block is rated by the users and where applicable is adapted according to their requirements. User A values a crispy topside above all in the case of a pork joint, therefore user A adds an additional five minutes grilling operation after the expiration of the 60 minutes. A new recipe block is therefore provided that is derived from the basic recipe block, however includes different cooking parameters. This recipe block that is derived can be transferred by user A to the database and can be amended again and rated by other users. A user B extends the grilling time of the recipe block that has been amended by user A by way of example by another five minutes, conversely a user C switches on the microwave for a couple of minutes. Each of these amended recipe blocks is added to a "recipe function tree" as a variant and can be followed, commented on and rated by all users. The user ratings can be part of an overall rating or can be calculated separately according to user preference. The users can have previously entered their preferences into a user profile so that different user subgroups can be formed, for example users who love a crispy crust (crust group), quick cooking (quick group) and users who have a preference for particularly tender meat (tender group). Each recipe block consequently obtains in each case at least one rating per user subgroup. It is therefore possible to suggest to users the recipe block that matches their preferences. The users only select the dish type on the operating element, in this case pork joint, and the cooking appliance automatically selects the settings that are suitable for the preferences. The recipe block is tailored to the user.

In general, there is also the possibility of combining multiple user profiles. As a consequence, the advantage is achieved that a program package can be made available that at least approximately meets the preferences of all users of the combined user group. It is therefore possible, for example in the case of recipe blocks, to provide for one family a recipe that is acceptable for all the family members. In particular, it is possible to suggest recipe blocks that have been rated as good or probably good by all family members. One recipe block can also be embodied so that portions of the food are removed after a specific time and the remaining portion is adapted to the requirements of other family members. In one example, a user cooks potatoes au gratin for themselves and their family. One part of the family likes particularly crispy, browned potatoes, the other part of the family prefers pale potatoes that are firm to bite. It is possible to suggest a recipe block or cooking sequence in which the potatoes are initially only lightly cooked and browned and the user is then prompted to remove a portion of the gratin and to subsequently provide a crispy crust for the rest of the gratin.

One development is that program packages that are stored in the database, in particular recipe blocks, can be shared with other people via social media. It is therefore possible for a user to share a link to a program package in a community for the program package that is provided in the database (and for example has been created or modified by the user themselves and then transferred or uploaded to the database), for example by means of sending a link to this program package in the form of a URL or a QR code.

In general, a user can transfer program packages, in particular recipe blocks, directly via the household appliance to the database and/or can download said program packages from the database. The user can also directly access the database via the household appliance in order to view, rate, select etc. program packages. Alternatively or in addition thereto, a user can perform one or multiple functions that are associated with a program package such as triggering the transfer (upload) of a program package to the database, downloading a program package from the database, viewing a program package, selecting a program package, rating a program package, editing (amending, supplementing etc.) a program package, via a user end device. By way of example, a program package can be opened by means of an app, for example on a user end device such as a smartphone or a tablet PC, and a transfer of the respective program packages or at least the associated operating parameters to the particular cooking appliance can be triggered via said user end device. As a consequence, a user end device can also have an actuating field for triggering the automatic transfer of the relevant operating parameters to the database, for example also in the form of a remote control of the household appliance.

In general, a user can access the database independently of the household appliance by means of a user end device, by way of example in order to search for, to view, to comment on, to rate program packages, to provide program packages with interactive elements, to download program packages to the household appliance etc. In general, it is also possible for a user to create program blocks on the user end device by importing at least the relevant operating parameters and to transfer said program blocks to the database.

In one development, it is also possible to permit an operating sequence to run on a household appliance, to transfer the relevant operating parameters that are associated with said operating sequence to a user end device and to view and/or to amend these relevant operating parameters or a program package that has these relevant operating parameters on the user end device, for example via a suitable app. These relevant operating parameters or the corresponding program package can then be transferred from the user end device to the database. It is therefore possible on the end user device to add user specifications and/or interactive elements to the program package before said program package is transferred to the database.

There is also the possibility by means of the household appliance system to perform a data analysis of the inventory and/or the further development of program packages, in particular recipe blocks, (for example comprising a "recipe block function tree" and iteratively obtained data having the implemented changes, comments and the respective user ratings). This can be performed by means of known methods such as "community detection" and "topic detection". The advantage is therefore achieved that it is rendered possible to identify a trend or user-individual recommendation strategy. In this case, in particular the complete database can be drawn upon with all user inputs and ratings. The scope of the database continuously grows and the statements that are derived from said database are subject to dynamic change. In this manner, it is possible to predict a trend development.

The active or passive participation of the user in the rating of program packages can be prompted in one development by rewards or other advantage incentives, for example by an "incentive budget". An active participation in the case of cooking appliances takes place for example by downloading and rating existing recipe blocks, and also by adding or changing recipe blocks, where applicable supported by images and commentary or amended settings. Conversely a user participates in a passive manner if their uploaded information is seen or further improved. The "incentive budget" can be credited in the form of discounts and bonus points when shopping for new appliances, accessories or digital content.

The object is also achieved by a method for operating a household appliance in which
- an operating sequence is implemented on a network-compatible household appliance and
- after terminating the operating sequence, relevant operating parameters for this operating sequence are transferred automatically in a manner triggered by the user to an external database.

The method can be embodied in a similar manner to the household appliance and household appliance system that are described above and provides the same advantages.

One embodiment is that in addition the operating parameters that are stored in the external database can be retrieved by at least one network-compatible household appliance in order to implement a corresponding operating sequence.

In particular when using cooking appliances as household appliances, one or multiple of the following advantages can be provided:

Users are actively integrated in the development of recipes. As a consequence, the recipe blocks suit the wishes of customers and after amendments serve the tastes of the majority. The risk of providing recipes that are not adopted by the customers is clearly reduced.

It is likewise easier to follow current cooking trends since the recipe blocks can always adapt and users can expand the database themselves.

It is possible to reduce the testing outlay in the in-house test kitchens by virtue of the further development of the recipe blocks being performed by the user. Trends can be recognized promptly and can be incorporated into the development of new appliances.

The option of storing the current state of a recipe block or creating recipe blocks themselves including cooking parameters offers the user the possibility of personalizing their cooking appliance.

The simple transfer of the recipe block for each application program to the cooking appliance facilitates the user in following the recipe and minimizes the probability of application errors.

The feedback is automatically precisely allocated to the cooking parameters that are set. It is therefore possible to clearly identify which settings have been used or are preferred by a user. If regulatory external interventions are necessary (for example by a manufacturer in order to curtail unhealthy or dangerous trends), these interventions are probably limited to a small extent.

The purchase of high-quality product lines moreover appears more attractive to users since more recipes are available for these appliances (owing to the more diverse possibilities as a result of the more numerous operating modes). In this case, it is important that recipes in general can be transferred particularly easily to higher-quality configuration lines since all the operating modes are likewise provided in said higher-quality configuration lines but a transfer to a lower-quality configuration line is only possible in rare cases since quite simply in this case operating modes are not provided (for example steam or microwave). In other words: "downsizing" is rarely possible.

All the users contribute to the fact that good recipes are developed further and are kept current or that good recipes are mainly provided first. The user has maximum use of a fully equipped premium appliance which is why the least possible limitations in relation to possible operating modes or special functions apply to the user.

In general, the above-described program packages can also be provided for more than one household appliance. The program packages for example can also comprise operating parameters of a recipe package for two or more different cooking appliances, by way of example an oven and a hob. As a consequence, the advantage is provided that a recipe package for preparing food can also be provided by means of two or more different cooking appliances.

The examples and embodiments described above for cooking appliances can be transferred in a similar manner to other household appliances.

BRIEF DESCRIPTION OF THE DRAWINGS

The above-described characteristics, features and advantages of this invention and also the manner in which these are achieved become clearer and more easily understandable in conjunction with the following schematic description of an exemplary embodiment that is further explained in conjunction with the drawings.

DETAILED DESCRIPTION OF EXEMPLARY EMBODIMENTS OF THE PRESENT INVENTION

Figure 1:
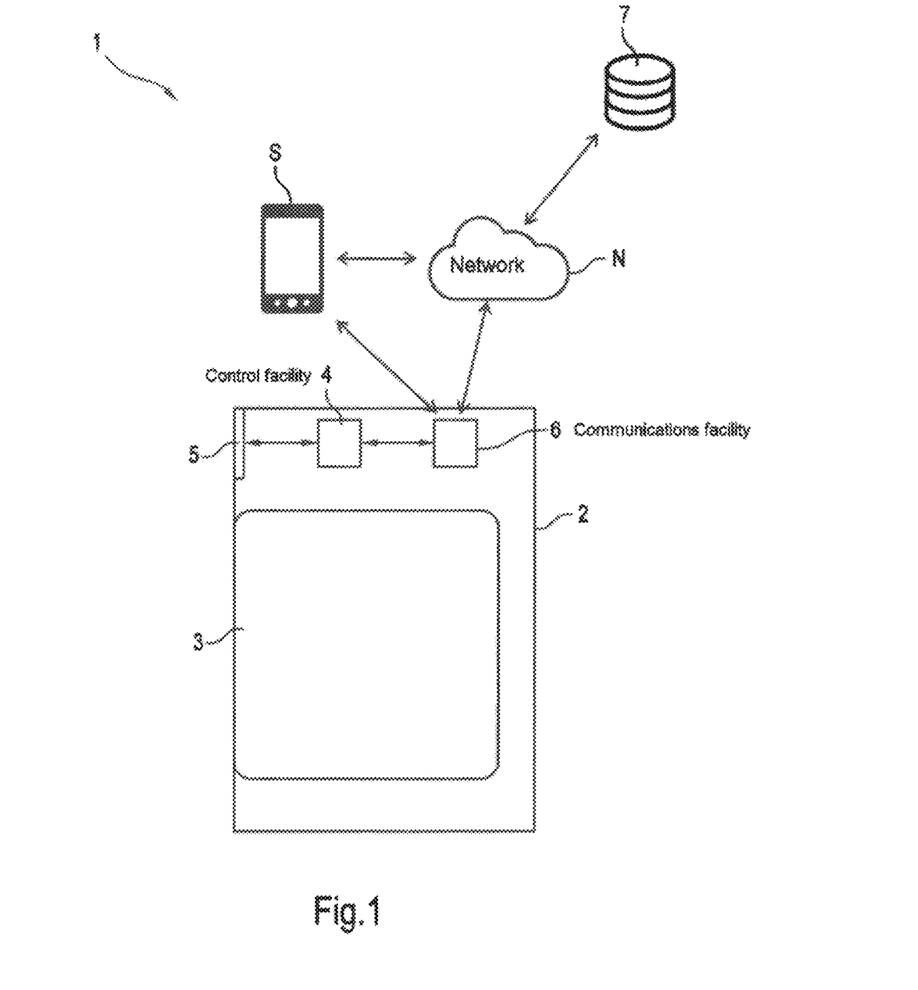
FIG. 1 shows a sketch of a household appliance system having a household appliance and a database.

FIG. 1 illustrates a sketch of a household appliance system 1. The household appliance system 1 comprises a network-compatible household appliance in the form of for example a baking oven 2.

The baking oven 2 has a cooking compartment 3 in which the food can be handled. In one development, in addition to its conventional heating modes (upper heating, lower heating, grill, hot air, circulating air etc.) for the cooking compartment 3, the baking oven 2 can also have a microwave functionality and/or a steam-generating functionality. The operation of the baking oven 2 can be controlled by means of a control facility 4 that is also connected via a data link to a user interface 5 and to at least one communications module 6.

The user interface 5 that can be embodied for example as a touch sensitive screen or control panel is used for the purpose of receiving user settings and relaying said user settings to the control facility 4. In particular, a user can set cooking parameters via the user interface 5 and can read information regarding an operating sequence.

The at least one communications module 6 renders it possible to couple the baking oven 2 to an external database 7 via a data link, for example via a data network N. The communications module 6 can then be for example a wireless local area network module. The database 7 can be located in a server (not illustrated) or can be cloud-based. The database proprietor can be the manufacturer of the baking oven 2. The database 7 can be connected to further household appliances, in particular of the same manufacturer.

The at least one communications module 6 further renders it possible to couple the baking oven 2 to a user end device S, for example a smartphone, via a data link. This coupling via a data link can likewise be provided via the data network N, for example by means of the wireless local area network module. The communications module 6 however can be configured for the direct coupling to the user end device S via a data link, for example as a Bluetooth module. This renders it possible to remotely control the baking oven 2 via the user end device S.

The user end device S can also be connected via the data network N to the database 7, for example by permitting a corresponding application program to be executed.

The database 7 is configured or provided for storing relevant operating parameters for an operating sequence of the household appliance (in this case: cooking parameters for executing a cooking procedure on the baking oven 2) and for providing said operating parameters in a retrievable manner for the baking oven 2 or other baking ovens or cooking appliances. The relevant operating parameters can represent parts of a recipe block that can also include yet additional specifications and information. The database 7 is therefore in particular configured or provided for the purpose of storing entire recipe blocks.

The recipe blocks that are stored in the database 7 can be set by a manufacturer or third-party provider. In addition, users can set recipe blocks, for example the user of the baking oven 2. For this purpose, the baking oven 2—in particular its control facility 4—is configured for the purpose of in a manner triggered by the user automatically transferring to the database via the at least one communications module 6 the relevant operating parameters for a cooking sequence that is implemented by the baking oven 2, in particular within a recipe block. This is performed in a manner triggered by the user automatically or "at the push of a button". For this purpose, the user can actuate a corresponding actuating field on the user interface 5 or on the user end device S.

It is possible that a user adds additional user specifications, interactive elements etc., that become a component part or parts of the recipe block and consequently are transferred together with the relevant operating parameters to the database. The user specifications, interactive elements etc. can comprise for example comments, images and ratings of the cooking sequence that is associated with the recipe block, including for example user specifications with regard to a cooking result (in other words at least one characteristic of a food that is to be handled by the operating sequence) and/or with regard to the cooking sequence as such.

With regard to inputting user specifications, in one development after triggering the transfer a—for example menu-controlled—query mask can be provided in the user interface 5 and/or on the user end device S in order to query the user specifications. The query mask can be operated (for example filled out) by a user inputting user specifications (for example regarding the rating of the cooking result globally or in more categories) or can be skipped or ignored if the user is not interested.

Moreover, the baking oven 2 can receive relevant operating parameters for an operating sequence from the database via the communications module 6 and can store said operating parameters for implementing an operating sequence, for example in the control facility 4. In particular, the baking oven 2 can receive recipe blocks that also have additional specifications and information with regard to the cooking sequence or have interactive elements in addition to the relevant operating parameters for the operating sequence. In one development, these additional specifications and information (for example user comments, instructions for preparing food, ratings etc.) can be displayed in the user interface 5 and/or on the user end device S.

In particular, it is possible for a user of the baking oven 2 to download a recipe block from the database 7 to the baking oven 2 in an amended form and for the accordingly amended operating parameters to be uploaded again within a variant of the recipe block into the database 7, where applicable together with the additional specifications and information.

Moreover, it is possible that an average rating is calculated from multiple individual ratings for a set of cooking parameters of a cooking sequence or for a recipe block that is stored in the database 7. The average rating can be stored in the database linked to the cooking sequence (for example as information or an entry of the recipe block) and can be retrieved by users. The average rating can be displayed for example as a numerical value and/or graphically (by way of example by stars).

In particular, it is possible to keep multiple variants of a cooking sequence or recipe block stored together with their ratings in the database 7 and after at least one predetermined event has occurred it is possible to only store the variant(s) with the highest average rating(s). Variants of a cooking sequence or recipe block can be identified as variants of a base recipe block for example by their identifier or ID.

It is also possible to keep multiple variants of an operating sequence or recipe block stored together with their ratings in the database and to store two variants as different cooking sequences after fulfilling at least one criterion, in other words to create two independent recipe blocks from two variants of one recipe block.

Moreover, it is possible starting from a preceding cooking sequence to store a cooking sequence as a standalone cooking sequence for which a group of individual ratings of the preceding cooking sequence represents a significantly different or differentiable subset of ratings.

It is also possible to store cooking parameters for a cooking sequence of a baking oven 2 and to provide in a retrievable manner the cooking parameters for at least one network-compatible baking oven having a different functionality in an amended form. In particular, it is possible in this case that the baking oven having a different functionality in comparison to the baking oven 2 has a reduced functionality and at least one operating parameter of the baking oven having a reduced functionality can be adapted so that when the cooking procedure is performed on the baking oven having the reduced functionality, a cooking result is approximated with respect to the handling result of the baking oven 2. By way of example, if the baking oven 2 has a microwave functionality and the cooking parameters of a specific recipe block comprise activating the microwave function, the recipe block can be modified for use on a baking oven without a microwave functionality so that the influence of the microwaves in the recipe block is approximated by adapting the cooking parameters of the baking oven without the microwave functionality. The cooking time can therefore be extended in the baking oven without the microwave functionality in order to compensate for the lack of microwave power.

Figure 2:
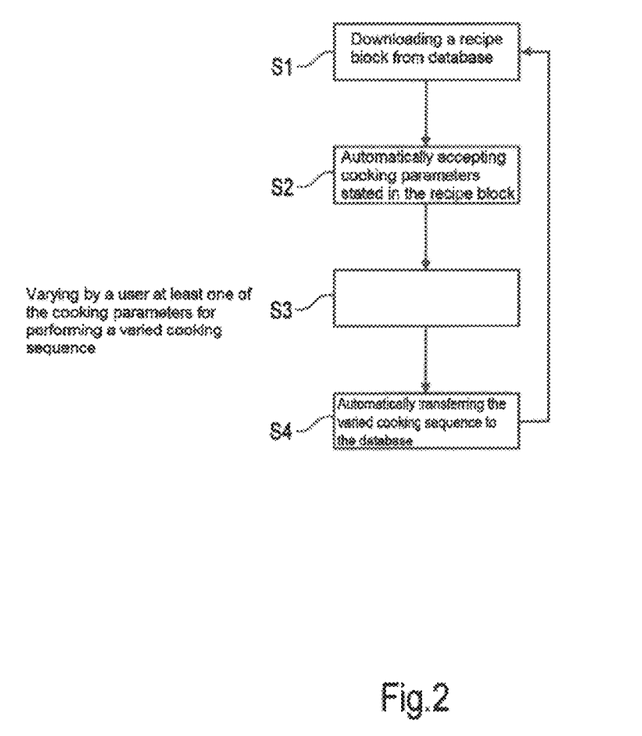
FIG. 2 shows a method sequence for operating the household appliance and/or the household appliance system.

FIG. 2 illustrates a method sequence for operating the baking oven 2 and/or the household appliance system 1. In this case, there is a requirement that a first recipe block R1 is stored in the database 7 and namely with an associated identifier ID1. The user of the baking oven 2 can search through the database 7 for recipes and can have decided to cook the recipe that corresponds to the recipe block R1.

In a first step S1, the user downloads the recipe block R1 from the database 7 to the baking oven 2. The selection of the recipe block R1 and the procedure of issuing the instruction to download the recipe block R1 by the user can be made by means of the baking oven 2 or by means of the user end device S (for example via a corresponding app).

In a second step S2, the user would like to cook the recipe that corresponds to the recipe block R1 however in a slightly modified manner. For this purpose, the cooking parameters that are stated in the recipe block R1 can be automatically accepted by the baking oven 2 after being downloaded from the database.

In a third step S3, the user varies at least one cooking parameter and permits an accordingly varied cooking sequence to be performed on the baking oven.

In a fourth step S4, after the varied cooking sequence is terminated an accordingly varied second recipe block R2 for the varied cooking sequence is automatically transferred in a manner triggered by the user to the database, where applicable together with other specifications and information such as comments, images, ratings, interactive elements etc. This second recipe block R2 is provided with an identifier ID2 from which it is possible to discern that said second recipe block represents a variant of the recipe block R1, in other words that ID2=ID2 [ID1].

These steps S1 to S4 can subsequently be repeated by the same user or other users and namely for example can be applied to the first recipe block R1 or the second recipe block R2.

Obviously, the present invention is not limited to the illustrated exemplary embodiment.

In general, "a", "one" etc. can be understood to mean singular or plural, in particular in the sense of "at least one" or "one or more" etc. as long as this is not explicitly ruled out, for example by the expression "precisely one" etc.

A specification of a number can also comprise precisely the specified number as well as a customary tolerance range as long as this is not explicitly ruled out.

LIST OF REFERENCE CHARACTERS

1 Household appliance system
2 Baking oven
3 Cooking compartment
4 Control facility
5 User interface
6 Communications module
7 Database
N Data network
S User end device
S1-S4 Method steps

The invention claimed is:

1. A network-compatible household appliance, comprising a communications facility for coupling via a data link to an external database, said household appliance being configured to:
receive operating parameters relevant for an operating sequence from the database via the communications facility,
store the operating parameters for implementing the operating sequence by the household appliance, and
in response to being triggered by a user, automatically transfer the operating parameters for the operating sequence to the database via the communications facility;
wherein the household appliance is further configured to query a user specification associated with the operating sequence and to transfer the user specification together with the operating parameters to the database, wherein the user specification comprises a rating of a characteristic of a commodity that is to be handled in response to the operating sequence.

2. The household appliance of claim 1, further comprising an actuating field configured to trigger the automatic transfer of the operating parameters to the database.

3. The household appliance of claim 1, wherein the user specification comprises a rating of multiple characteristics of a commodity handled in response to the operating sequence.

4. The household appliance of claim 1, wherein the household appliance is configured to add an interactive element to the operating sequence and to transfer the interactive element together with the operating parameters to the database.

5. The household appliance of claim 1, constructed in the form of a cooking appliance.

6. A household appliance system, comprising:
a network-compatible household appliance comprising a communications facility;
a database storing operating parameters relevant for an operating sequence to be implemented by the household appliance and providing in a retrievable manner the operating parameters to the household appliance; and
a network configured to couple the communication facility of the household appliance to the database;
wherein the database is configured to enable a user to submit a rating for a set of operating parameters of an operating sequence, and the household appliance system is configured to calculate an average rating from multiple individual ratings, wherein the average rating is stored in and retrieved from the database such that the average rating is linked to the operating sequence.

7. The household appliance system of claim 6, wherein the database is configured to store sets of operating parameters of multiple variants of an operating sequence together with their ratings, said household appliance system being configured to only store a one of the variants which has a highest average rating after a predetermined event has occurred.

8. The household appliance system of claim 6, wherein the database is configured to store sets of operating parameters of multiple variants of an operating sequence together with their ratings, said household appliance system being configured to store at least two of the variants as different operating sequences.

9. The household appliance system of claim 6, wherein the household appliance system is configured to store an operating sequence as a stand-alone operating sequence based upon a previous operating sequence and a group of individual ratings of the preceding operating sequence represents a differentiable subset of ratings for the stand-alone operating sequence.

10. The household appliance system of claim 6, wherein the household appliance system is configured to store operating parameters for an operating sequence of the household appliance and to provide in a retrievable manner operating parameters of an operating sequence in an adapted form for a network compatible further household appliance having a functionality which is different than a functionality of the household appliance.

11. The household appliance system of claim 10, wherein the functionality of the further household appliance is reduced in comparison to the functionality of the household appliance for which the operating sequence is stored, said household appliance system being configured to adapt an operating parameter of the further household appliance so that when the operating sequence is executed on the further household appliance, a handling result is approximated with respect to a handling result of the household appliance for which the operating sequence is stored.

12. The household appliance system of claim 6, wherein the database is configured to generate variants of operating parameters relevant for an operating sequence and to store the variants in the database, with the variants being generated by an algorithm and the operating parameters being stored in the database.

13. A method for operating a network-compatible household appliance, said method comprising:
- implementing an operating sequence on the household appliance;
- when triggered by a user and after the operating sequence is terminated, automatically transferring operating parameters relevant for the operating sequence to an external database; and
- retrieving the operating parameters stored in the external database by a network-compatible household appliance in order to implement a corresponding operating sequence;
- wherein the external database is configured to enable a user to submit a rating for a set of operating parameters of an operating sequence; and
- wherein the external database is configured to store sets of operating parameters of multiple variants of an operating sequence together with their ratings, and configured to store at least two of the variants as different operating sequences.

* * * * *